A. UHLIR.
EGG SHELL REMOVER.
APPLICATION FILED APR. 6, 1910.
963,407.
Patented July 5, 1910.
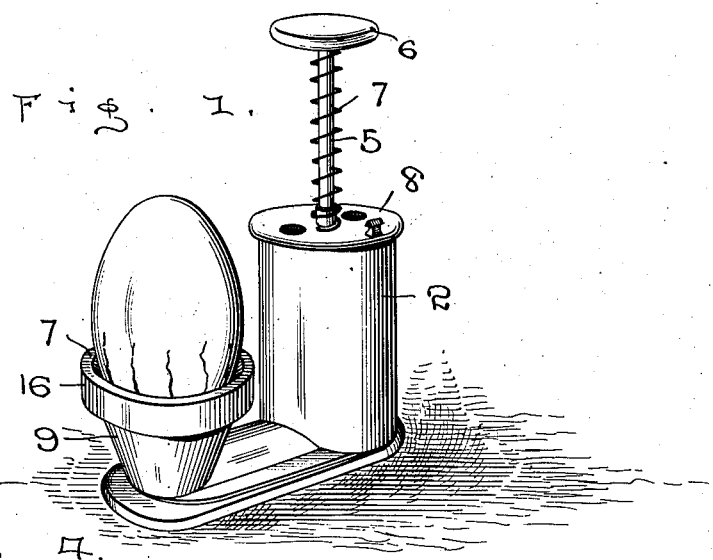
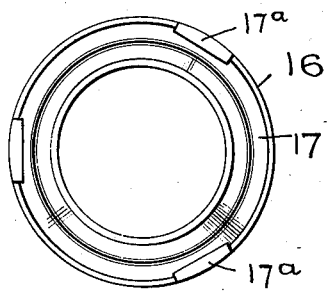
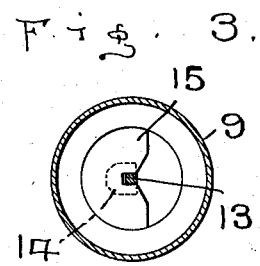
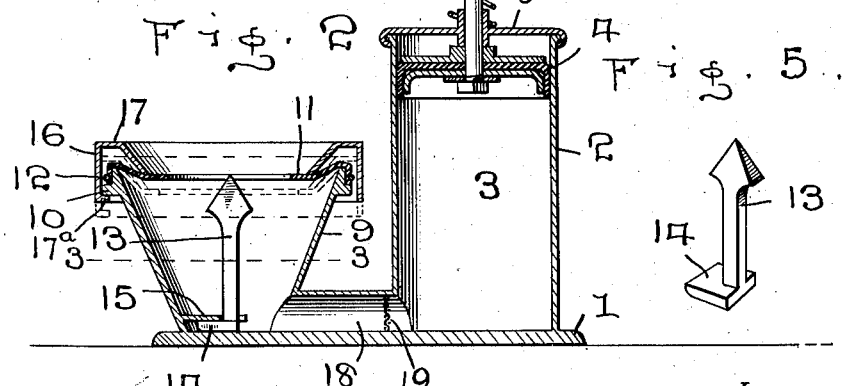
WITNESSES:
Thos W Riley
M. Newcomb
INVENTOR
A. Uhlir
BY W. J. FitzGerald
Attorneys

UNITED STATES PATENT OFFICE.

ANTON UHLIR, OF CHARLESTON, WEST VIRGINIA.

EGG-SHELL REMOVER.

963,407.     Specification of Letters Patent.     Patented July 5, 1910

Application filed April 6, 1910. Serial No. 553,860.

*To all whom it may concern:*

Be it known that I, ANTON UHLIR, a citizen of the United States, residing at Charleston, in the county of Kanawha and State of West Virginia, have invented certain new and useful Improvements in Egg-Shell Removers; and I do hereby declare the following to be a full, clear, and exact description of the invention, such as will enable others skilled in the art to which it appertains to make and use the same.

My invention relates to improvements in kitchen utensils and more particularly to egg-shell removers.

The object of my invention is to provide a simple device by means of which the shell may be removed from a cooked or partially cooked egg.

In the accompanying drawing, I have shown the preferred embodiment of my invention. It will be understood, however, that many modifications may be made therein without departing from the spirit or scope of the invention.

In said drawing, Figure 1 is a perspective view of the complete device as applied to use. Fig. 2 is a central sectional view through the complete device. Fig. 3 is a sectional view through a portion of the device as seen on line 3—3, Fig. 2. Fig. 4 is a bottom plan view of a portion of the device, and, Fig. 5 is a perspective view of a portion of the device.

In the embodiment of the invention shown, I provide a base plate 1, to one end of which is secured a tubular member 2. Said member 2 forms the cylinder of an air pump or compressor 3. Said pump 3 is provided with a closely fitting plunger 4 adapted to be reciprocated therein. A rod 5 is secured to the plunger 4 and an operating head 6 is secured to or formed integral with said rod. A spring 7 surrounds the rod and is disposed between the head 6 and the cap 8 of the cylinder 2 and tends to maintain the rod and plunger in the position shown. Also secured to the base 1 is a member 9 which is preferably circular in cross section and a flange 10 surrounds the member 9 near its upper end, said flange being cut away at intervals for a purpose to be hereinafter clearly set forth.

Secured across the upper end of the member 9 is a diaphragm 11 preferably formed of rubber. This diaphragm has a central, circular opening therein and may be secured in place by means of a wire or band 12 which encircles the edge thereof and the outer surface of the member 9. Secured in said member 9 and extending vertically therein is a perforating member 13. Said member may be secured in place in any desired manner or preferably by being provided with a foot portion 14 adapted to be forced between the base 1 and a semi-partition 15 secured horizontally in the member 9. The manner of fastening the perforating member 13 in place will be clearly understood by reference to Figs. 2 and 3, where it will be seen that the same is removably secured so that different shapes and sizes of perforators may be used.

Although I have shown a spear-shaped perforating member mounted in the chamber, I do not mean to limit myself to this showing and may use any form of perforating means, either within or without said chamber, as the suction of the pump upon the backward movement of the piston therein will retain the egg in position after the shell has been blown therefrom. It will be seen, however, that the particular form, as shown in the drawings, is the most desirable for obvious reasons.

A cap member comprising a ring 16 and a top portion 17 is provided for the member 9. Inwardly projecting lugs 17$^a$ are provided at intervals at the lower edge of the ring 16. Said lugs are so formed as to coincide with the cutaway portions of the flange 10 so that said cap member may be placed on the member 9 and partially rotated to bring the lugs 17$^a$ beneath the flange 10 to prevent the removal of said cap-like member. The top 17 is provided with a central aperture and the material adjacent the aperture is depressed, as clearly shown in Fig. 2, so that when the cap member is in position, the diaphragm will be engaged by the lower edge of the depressed portion. The ring portion 16 of the cap member is of greater width than the distance between the top of the member 9 and the flange 10, so that the cap member may be forced downward against the tendency of the diaphragm to hold it in its upward position. The pressure upon the diaphragm, being equal around the aperture therein, will cause a uniform stretching of said diaphragm when the cap member is depressed and a uniform enlargement of the aperture therein, as shown in dotted lines in Fig. 2. The member 9 and the cylinder 2 are connected by means of passage-way or duct 18.

When it is desired to remove the shell from an egg, the smaller end, or the end opposite the end having the air bubble, is placed against the cap member and forced downwardly, moving the cap member to its lowest position and at the same time causing the shell to be broken by the perforating member 13. The perforating member 13 is preferably made spear-shape, as shown, so that the contents of the shell will be held thereby. Upon releasing the egg, the diaphragm, which has been stretched, will contract and tightly grip the end of the egg. The head 6 is now quickly depressed, causing a volume of air to pass from the cylinder 2 into the chamber 9 and thence through the aperture in the end of the egg. The shell will be broken away by the air pressure, leaving the contents of the egg held by the spear-shaped end of the perforating member.

I wish to call attention to the screen 19 which is placed in the passageway 18 and conforms in outline thereto to prevent particles of shell, etc., from being sucked back into the pump when the plunger is released.

What I claim is:—

1. In an egg-shell remover, in combination, means to engage one end of an egg, means to perforate the shell, and means whereby air may be forced into said shell.

2. In an egg-shell remover, in combination, a chamber for receiving one portion of an egg, means to perforate the shell thereof and means to compress air in said chamber.

3. In an egg-shell remover, in combination, a chamber, a resiliently supported member at one end thereof for receiving one end of an egg, a perforator in said chamber adapted to perforate the egg-shell and means to compress air in said chamber.

4. In an egg-shell remover, in combination, a chamber, a resiliently supported member at one end thereof for receiving one end of an egg, a perforator in said chamber adapted to perforate the egg-shell, and a pump for compressing air in said chamber.

5. In an egg-shell remover, in combination, a chamber having its upper end open, a diaphragm across said open end, said diaphragm having a centrally disposed aperture therein, a cap for the upper end of said chamber, said cap having a centrally disposed aperture of greater diameter than the diaphragm aperture and having a depending portion around said aperture adapted to rest against the diaphragm, said cap having a limited downward movement, a perforator, and a pump for compressing air in said chamber.

6. A device for removing the shell of an egg by means of air under pressure.

7. An egg-shell remover, comprising means to utilize compressed air to strip the egg of its shell.

8. An egg-shell remover, comprising a chamber for receiving the end of an egg, means to perforate the egg-shell, a pump for compressing air into said chamber and means to prevent the entrance of extraneous matter into said pump.

In testimony whereof I have signed my name to this specification in the presence of two subscribing witnesses.

ANTON UHLIR.

Witnesses:
C. E. GOETTMAN,
C. W. GOOD.